Feb. 26, 1957 F. BERTINOT 2,782,922
SIZING APPARATUS
Filed Jan. 25, 1952 7 Sheets-Sheet 1

INVENTOR
FRANCIS BERTINOT
BY Bill Cohen
ATTORNEY

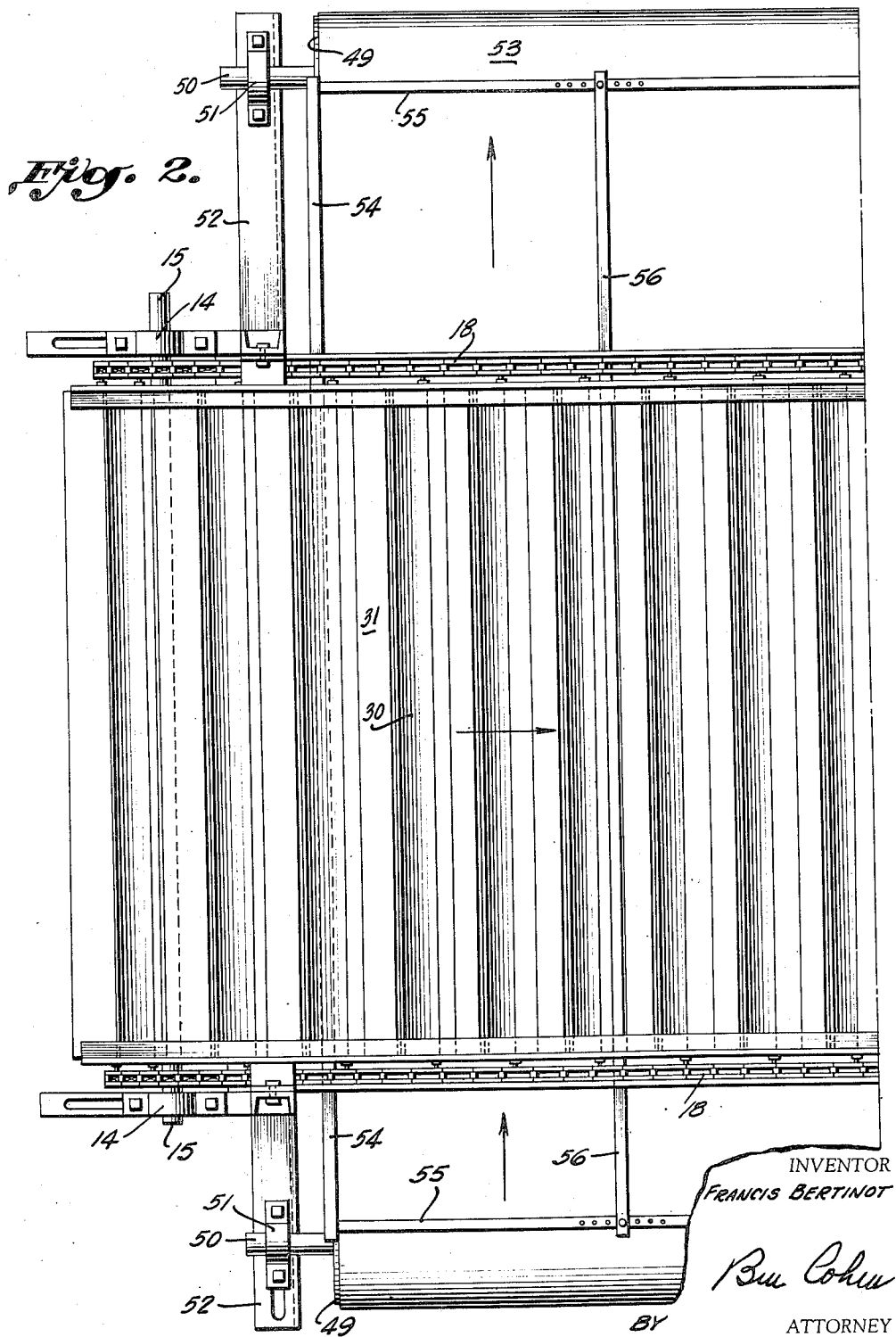

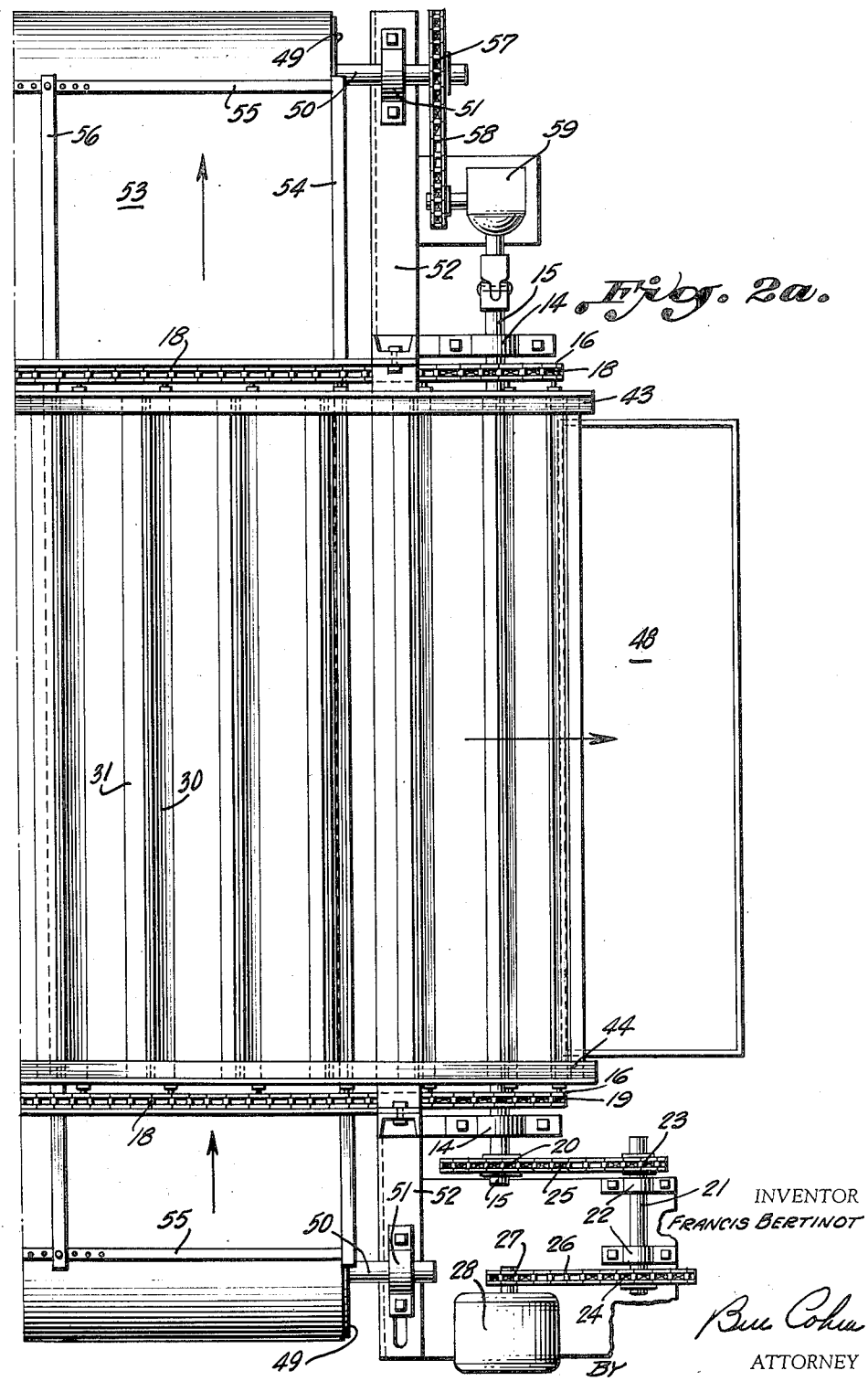

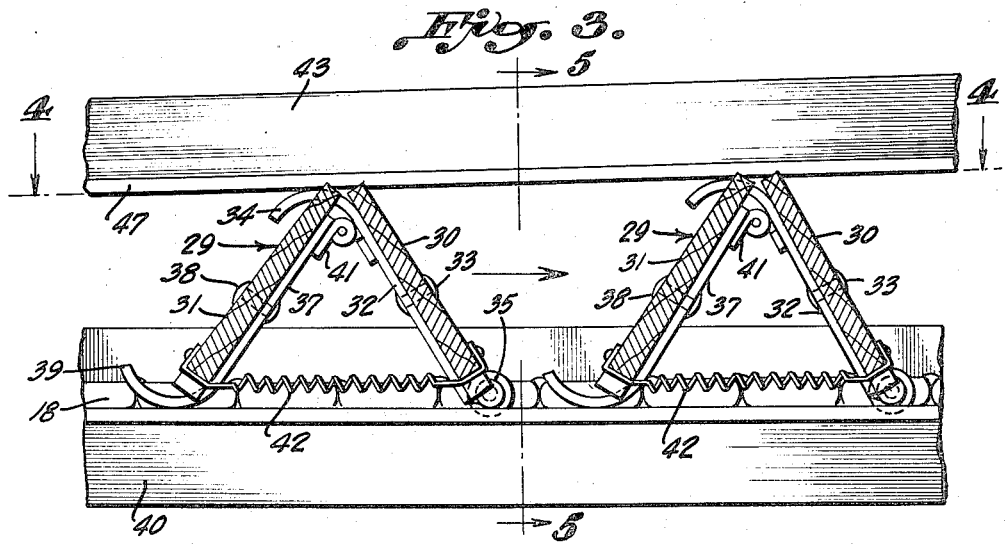
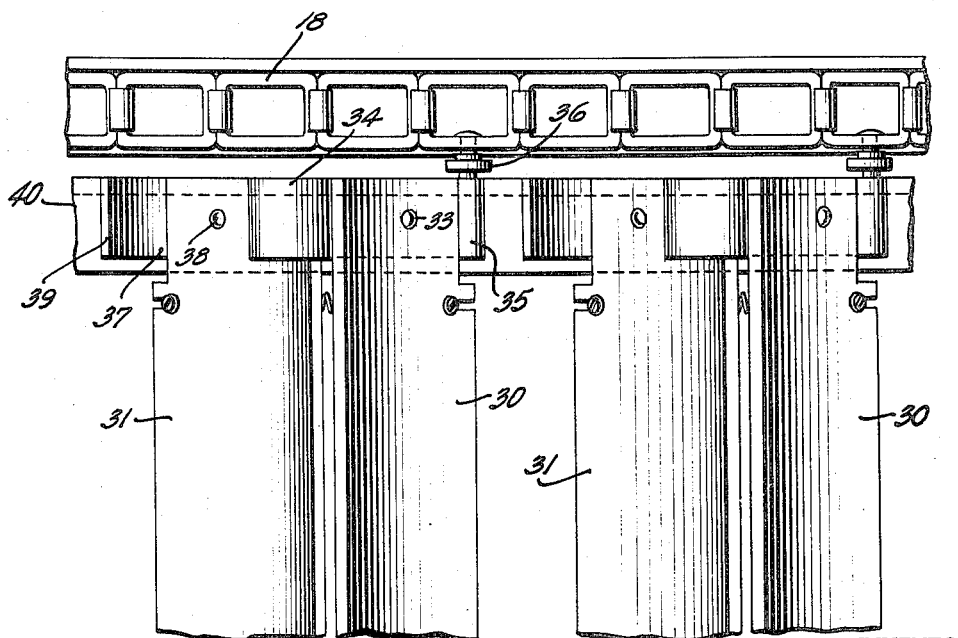

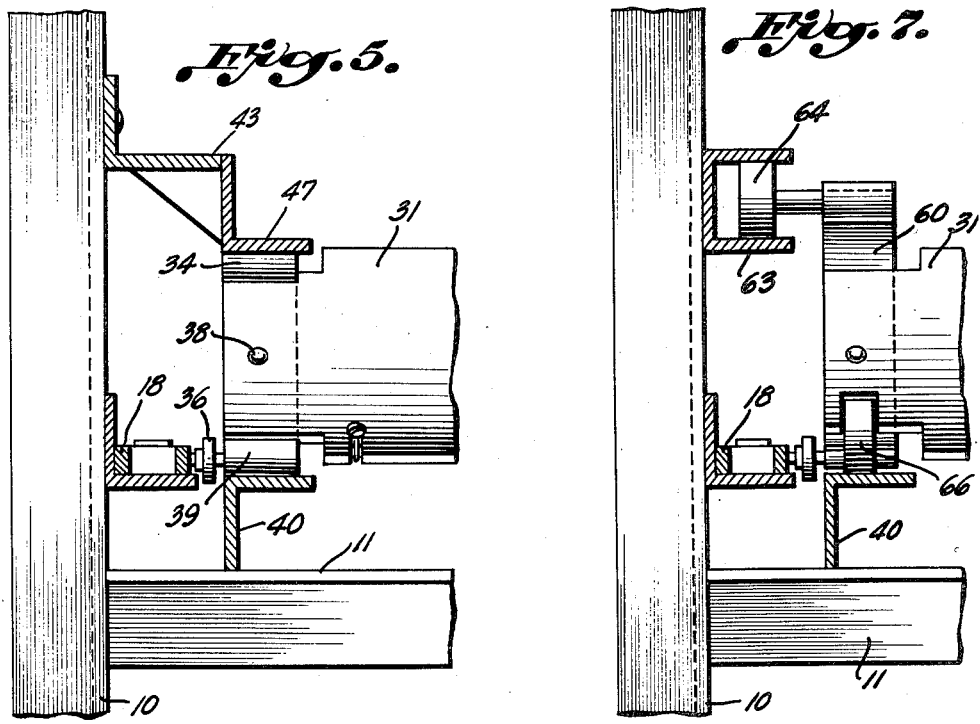
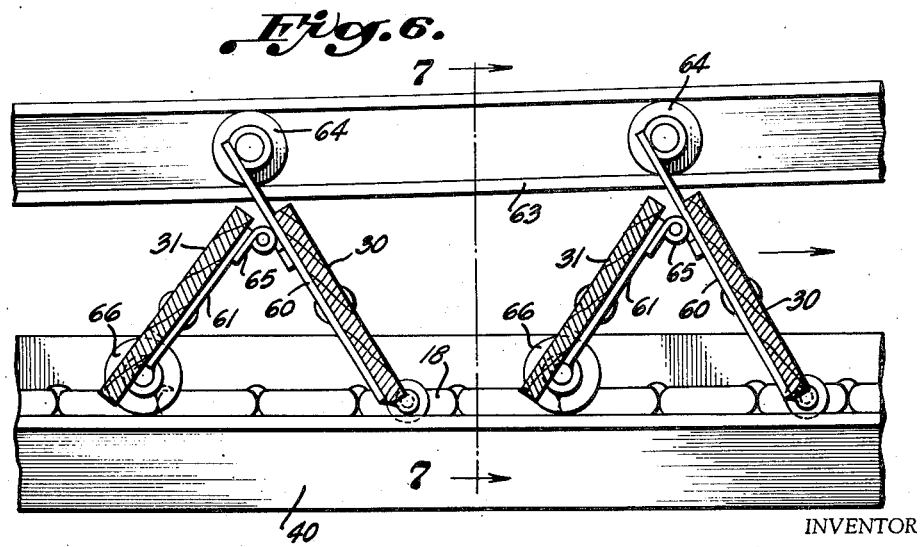

Feb. 26, 1957   F. BERTINOT   2,782,922
SIZING APPARATUS
Filed Jan. 25, 1952   7 Sheets-Sheet 6

INVENTOR
FRANCIS BERTINOT
BY
ATTORNEY

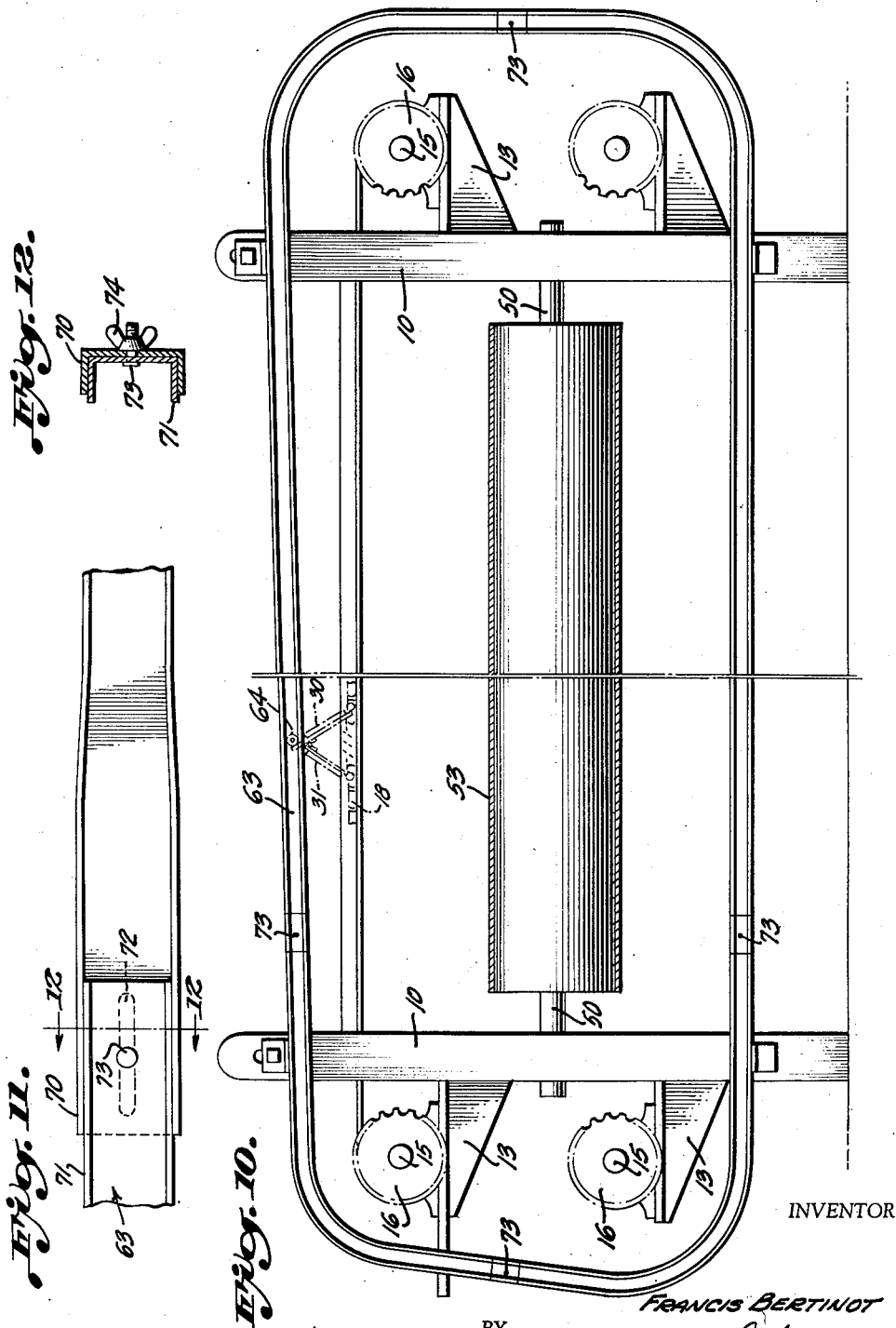
Feb. 26, 1957    F. BERTINOT    2,782,922
SIZING APPARATUS
Filed Jan. 25, 1952    7 Sheets-Sheet 7
INVENTOR
FRANCIS BERTINOT
BY
ATTORNEY

United States Patent Office 2,782,922
Patented Feb. 26, 1957

2,782,922

SIZING APPARATUS

Francis Bertinot, Church Point, La.

Application January 25, 1952, Serial No. 268,279

5 Claims. (Cl. 209—102)

This invention relates to a machine for sorting or grading fruits, vegetables and other articles according to size, and has generally in view to provide a simple, practical and compact machine which is thoroughly reliable and highly efficient in operation.

Generally, the present machine comprises a grading surface in the form of a moving carrier having means thereon providing spaces of successively greater widths through which the articles are dropped. The smaller articles drop through the narrower spaces while the larger articles drop through only the wider spaces, whereby sorting or grading of the articles according to size is effected. Positioned below the moving carrier and moving at right angles thereto is a conveyor mechanism for receiving the sized articles and conveying them to a plurality of bins positioned at one edge of the machine. A machine constructed to operate on this principle has the material advantage of being compact and capable of handling large volumes of articles in relatively short periods of time.

A specific feature of the invention resides in the provision of a plurality of cooperating slats in combination with a novel guiding arrangement, said slats constituting the moving carrier and combining with the guiding arrangement to provide the spaces of successively greater widths.

A further object of the present invention consists in providing a novel arrangement for advancing the sizing mechanism through an endless path of travel, the sizing mechanism being constructed for efficiency and simplicity of construction.

With the foregoing and other objects in view, which will become more fully apparent as the nature of the invention is better understood, the invention consists of a sorting or grading machine embodying the novel features of construction, combination and arrangement of parts as will be hereinafter more fully described, illustrated in the accompanying drawings and defined in the appended claims.

In the accompanying drawings, wherein like reference characters denote corresponding parts in the different views:

Figure 1 is a side elevation of a sorting or grading machine constructed in accordance with one practical embodiment of the invention;

Figures 2 and 2a combine to form a top plan view of the machine;

Figure 3 is an enlarged sectional view of the slat construction;

Figure 4 is a sectional view taken on the line 4—4 of Figure 3;

Figure 5 is a sectional view taken on the line 5—5 of Figure 3;

Figure 6 is a view similar to Figure 3 showing a slight modification of the structure shown in Figure 3;

Figure 7 is a sectional view taken on the line 7—7 of Figure 6;

Figure 10 is a front elevational view of a modified form of frame structure;

Figure 11 is an enlarged detail view of a slip joint shown in Figure 10; and

Figure 12 is a sectional view taken on the line 12—12 of Figure 11.

Figure 1:
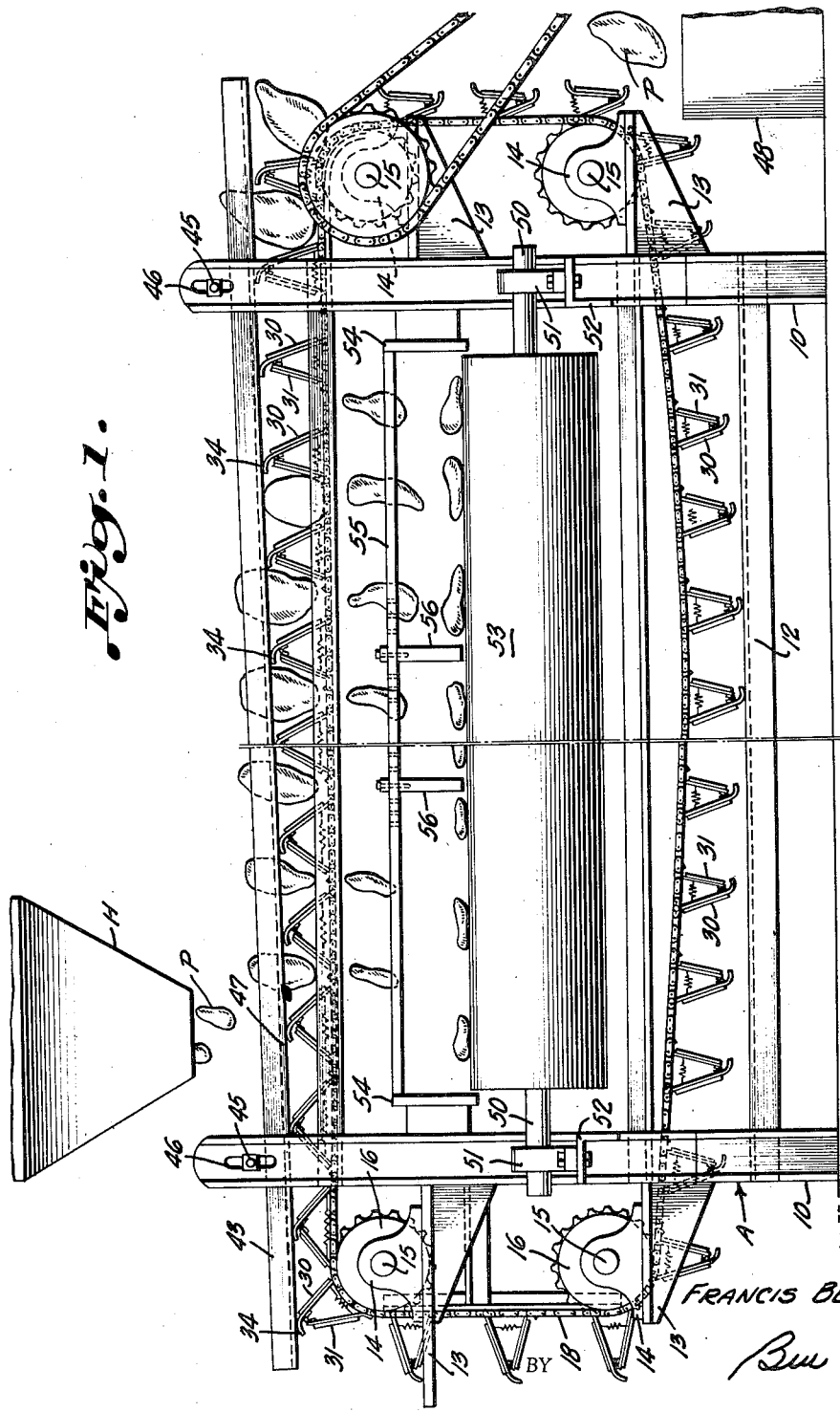

Referring to the drawings in detail, A designates, generally, the frame of the machine which may be formed from any suitable material and which, generally speaking, is of elongated, rectangular form. This frame may be of any suitable or desirable length, width and height and may be composed of corner uprights or legs 10 connected together by suitable transverse members 11 and longitudinal members 12.

A plurality of platforms 13 are suitably secured to each end of the frame and support trunnions 14 which carry the transverse shafts 15. Each shaft 15 is provided at its ends with sprocket pulleys 16. Over these pulleys pass endless chains 18, one on each side of the machine.

Referring to Figure 2a, the upper shaft 15 at the forward end of the machine has mounted thereon a sprocket wheel 20. A shaft 21 supported on trunnions 22 is provided at its ends with sprocket wheels 23, 24. A sprocket chain 25 connects the sprocket wheels 20 and 23 and a second sprocket chain 26 connects sprocket wheel 24 with the sprockets wheel 27 on the motor 28.

The grading conveyor comprises a plurality of transversely extending members one form of which is shown in Figures 3, 4 and 5 and indicated by numeral 29. Each member comprises a pair of wooden paddles or slats 30, 31 of such size as to extend between the oppositely disposed endless chains 18 and 19. A metal strap 32 is affixed to the underside of paddle 30 adjacent one end thereof by means of a rivet 33. The paddles have been shown in the form of wooden paddles but this is for illustrative purposes only. It will be clear that the paddles may be formed of metal in which case the strap 32 can be formed as an integral part of the metal paddles.

The upper end of the strap 32 is curved at 34 to form a bearing surface for a purpose to be described. The lower end of the strap 32 is provided with a bearing sleeve 35 to rotatably receive the pin 36 which forms part of the endless chain 18. A similar strap 37 is affixed to the underside of paddle 31 by means of a rivet 38. The strap member 37 has its curved portion 39 at the lower end which bears against an angle iron 40 supported on transverse members 11. The two strap members are hinged together by a hinge 41 to form an inverted V-arrangement. A coil spring 42 has its ends suitably secured to each of the wooden paddles. As seen in Figure 3, the spring is secured to the lower edges of the paddles and being under tension, tends to bring the two paddles together. Positioned longitudinally of the machine at opopsite sides thereof are two rail members 43 bolted to the corner uprights 10 by means of bolts 45. The uprights are slotted to 46 to provide for adjustment of the rails. Each of the rails is provided with a horizontal flange 47 overlying the ends of the wooden paddles and against which the curved portion 34 of each strap 32 bears. The rails are mounted to form an inclnde grade towards the front of the machine for a purpose to be described. As seen in Figure 1, there are a large number of sets of paddles secured to the endless chains to extend around the entire length of the chains and are so spaced around the chains as to substantially abut each other when the two paddles of each set are expanded.

From the foregoing description, the manner in which the articles are graded according to size will be explained.

The objects indicated by the letter P and herein disclosed as sweet potatoes are fed to the rear end of the machine on to the travelling carrier from a hopper H. The endless chains, which are moved by the motor 28, carry each set of paddles to the upper left hand corner of the machine as viewed in Figure 1 until a set of paddles approaches an upright position. At this point, the distance between the angle iron 40 and the horizontal flange 47 is less than the width of the paddles, causing the paddles to assume the position shown in Figure 3 with each set of paddles lying adjacent the next set of paddles with no appreciable space between the two sets. As the chains move the paddles along, the curved portion 34 of strap 32 bears against the underside of flange 47 and the bushing 35 at the opposite end of strap 32 rides on the angle iron 40. The upper end of the strap 37 is pivoted to the strap 32 but its lower curved end bears against member 40 and is movable with respect to the lower end of strap 32. In the position of the paddles thus described, the spring 42 is under tension. It will be seen that the potatoes dropping on the carrier will be received between adjacent sets of paddles and carried along with the carrier. As each set of paddles passes beyond the hopper, the distance between rails 40 and 43 increases, thereby permitting the spring 42 to contract with the lower edges of the paddles of each set coming together. This provides a space between each set of paddles enabling small potatoes to drop through. As the paddles move along the top of the machine, the space between adjacent sets of paddles becomes larger permitting larger potatoes to fall through. Potatoes that are too large are carried over the end of the machine and drop into a bin 48.

Suitable means is provided below the upper portion of the machine to receive the graded potatoes which drop through the carrier and convey them to suitable receiving stations. At each side of the machine and positioned beyond the area of the moving carrier are rollers 49 mounted on shafts 50 which in turn rotate in trunnions 51 supported on frame members 52. An endless conveyor apron 53 is carried by the rollers 49 and conveys the potatoes to the side of the machine into a plurality of bins (not shown). Means is also provided to keep the sized potatoes from commingling on the conveyor apron during its travel. This means consists of a pair of transverse members 54 suitably secured to the frame of the machine, the ends of said members being joined by a pair of bars 55. Supported from these bars are a plurality of partition members 56 which extend to a joint just short of the apron surface. The number and position of the partition members may be varied depending on the size of the potatoes to be separated.

Referring to Figure 2a, the shaft 50 is provided with a gear 57, carrying a sprocket chain 58, connected to a right angle gear box 59 which also connects with shaft 15. This enables the use of a single motor 28 to drive both the endless carrier and the endless apron.

In Figures 6 and 7, there is shown a slightly modified construction of the guide rails shown in Figures 3, 4 and 5. In this construction, the paddles 30 and 31 are riveted to modified straps 60 and 61. The lower end of the strap member carries a bushing 35 as previously described but instead of a curved upper portion bearing against the undersurface of channel shaped member 63 the upper end of the strap has mounted thereon a roller 64 which rides in the channel shaped member 63. The complementary strap 61 has its upper end hinged to the strap 60 by means of a hinge 65, and is provided at its lower end with a roller 66 bearing against the angle iron 40. The operation of this construction is somewhat similar to the form previously described.

Figure 8:
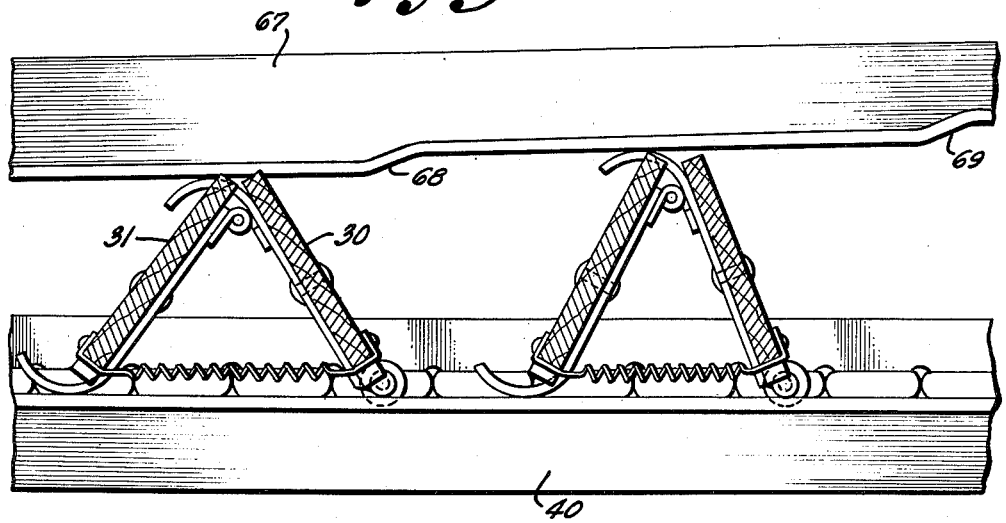
Figures 8 and 9 are further modifications of the structure shown in Figure 3.

Figure 8 discloses a construction similar to the arrangement shown in Figure 3, except for a modified upper guide rail 67. In the construction shown in Figure 3, the guide rail 43 is mounted to have a gradual inclination from the rear to the front of the machine. In the form shown in Figure 8, the rail is divided into zones by the sharply inclined portions 68 and 69 to provide step by step sizing. Thus, when the set of paddles reach point 68, the two paddles come together quickly causing the space between the sets to widen and retain this position until the point 69 is reached whereupon the space becomes larger by further narrowing of the complementary paddles.

Figure 9:
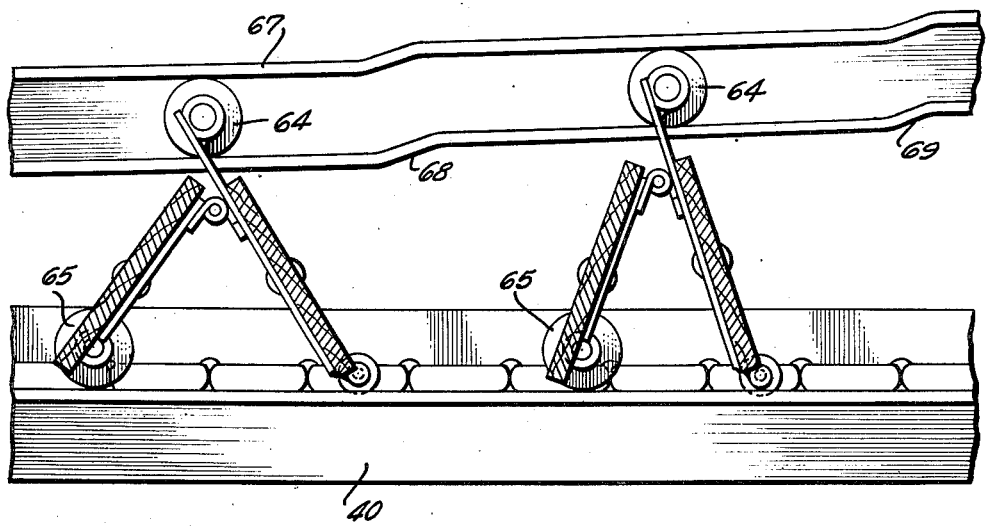

The modified form shown in Figure 9 combines the features described above in connection with Figures 3 and 8 and requires no detailed discussion.

In Figure 10, there is disclosed a modified frame construction in which the channel shaped guide member 63, shown in Figures 6 and 7, extends completely around the machine forming an endless guide channel for the rollers 64. The channel guide can also have the stepped arrangement shown in Figure 9.

For ease in assembling the endless channel guide, the guide is made of a plurality of sections, each section having an enlarged portion 70 for embracing an end 71 of an adjacent section. The enlarged portion 70 is provided with a slot 72 through which the bolt 73 extends. A wing nut 74 completes the assembly. It will thus be apparent that the construction described will permit ready assembly of the frame and will also permit a certain amount of adjustment in the size of the frame.

In this form of the invention, each of the guide rollers 64 is guided in its travel during a complete circuit of the machine.

From the foregoing description considered in connection with the accompanying drawings, it is believed that the construction and operation of the present machine will be clearly understood and its advantages appreciated. While I have shown several modifications, it will be clear that minor changes may be made in the details of construction without departing from the spirit of the invention. While the present machine discloses an endless apron for receiving the articles dropped through the carrier, it is within the scope of the invention to employ chutes in place of said apron for conveying the articles to the grading bins. This application is, therefore, not to be limited to the precise details described, but is intended to cover all variations and modifications thereof falling within the spirit of the invention and the scope of the claims.

Having thus described the invention, what is claimed is:

1. A sizing machine comprising a frame defining a horizontal supporting structure, a carrier movable on said supporting structure, said carrier comprising a plurality of sizing members cooperating to form a conveyor for the articles being sized, each of said members comprising two slats pivoted to each other along their upper edges thereby forming a downwardly opening trough-like member, a roller mounted on said member, means urging the lower edges of said slats together whereby to separate the slats of adjacent members, means mounted on the frame above the supporting structure for varying the distance between adjacent members, said means comprising an inclined guide member, and said guide member being channel shaped to receive the roller.

2. A sizing machine comprising a frame defining a horizontal supporting structure, a carrier movable on said supporting structure, said carrier comprising a plurality of sizing members cooperating to form a conveyor for the articles being sized, each of said members comprising two slats pivoted to each other along their upper edges thereby forming a downwardly opening trough-like member, means urging the lower edges of said slats together whereby to separate the slats of adjacent members, means for advancing said carrier on said supporting structure, guide means at each side edge of the frame and spaced above the frame, and means at the upper ends of each of the sizing members cooperating with the guiding means for varying the distance between adjacent sizing members.

3. A sizing machine as defined in claim 2, said guide means being of stepped formation.

4. A sizing machine as defined in claim 2, and means below the carrier for receiving and conveying the sized objects to receiving stations.

5. A sizing machine as defined in claim 2, and means below the carrier for receiving and conveying the sized objects to receiving stations, said means comprising an endless conveyor belt and adjustable means above said conveyor belt for defining zones on said belt.

References Cited in the file of this patent

UNITED STATES PATENTS

| Number | Name | Date |
|---|---|---|
| 475,497 | Fleming | May 24, 1892 |
| 932,749 | Barnett | Aug. 31, 1909 |
| 1,228,044 | Palmer | May 29, 1917 |
| 1,379,207 | O'Quinn | May 24, 1921 |
| 1,579,598 | De Back | Apr. 6, 1926 |
| 1,710,199 | White | Apr. 23, 1929 |
| 1,725,665 | Moe | Aug. 20, 1929 |
| 1,909,462 | Foon | May 16, 1933 |
| 2,244,729 | Sammis | June 10, 1941 |

FOREIGN PATENTS

| Number | Country | Date |
|---|---|---|
| 51,811 | Norway | Nov. 21, 1932 |
| 177,872 | Switzerland | Sept. 2, 1935 |
| 408,050 | Great Britain | Apr. 15, 1934 |